(12) United States Patent
Huang

(10) Patent No.: US 9,568,957 B2
(45) Date of Patent: Feb. 14, 2017

(54) ELECTRONIC DEVICE

(71) Applicant: Acer Incorporated, New Taipei (TW)

(72) Inventor: Kuan-Chang Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/061,135

(22) Filed: Mar. 4, 2016

(65) Prior Publication Data

US 2016/0327992 A1 Nov. 10, 2016

(30) Foreign Application Priority Data

May 5, 2015 (TW) .................................. 104114226

(51) Int. Cl.
G06F 1/16 (2006.01)
(52) U.S. Cl.
CPC ............. G06F 1/1679 (2013.01); G06F 1/162 (2013.01)
(58) Field of Classification Search
CPC ...... G06F 1/1615; G06F 1/1616; G06F 1/162; G06F 1/1637; G06F 1/1649
See application file for complete search history.

(56) References Cited

U.S. PATENT DOCUMENTS

| | | | | |
|---|---|---|---|---|
| 6,229,693 B1 * | 5/2001 | Karidis | ................. | G06F 1/1616 361/679.05 |
| 7,762,515 B2 * | 7/2010 | Lin | ........................ | F16M 11/24 248/133 |
| 8,953,310 B2 * | 2/2015 | Smith | ....................... | G06F 1/16 160/266 |
| 2005/0099765 A1 * | 5/2005 | Wang | ...................... | G06F 1/162 361/679.06 |
| 2010/0238620 A1 * | 9/2010 | Fish | ....................... | G06F 1/1616 361/679.09 |
| 2012/0262857 A1 * | 10/2012 | Fukaya | ............... | H04M 1/0216 361/679.01 |
| 2014/0118929 A1 * | 5/2014 | Leung | ..................... | G06F 1/162 361/679.55 |
| 2014/0299740 A1 * | 10/2014 | Peng | ..................... | G06F 1/1632 248/688 |
| 2014/0340843 A1 * | 11/2014 | Huang | .................... | G06F 1/162 361/679.55 |

(Continued)

FOREIGN PATENT DOCUMENTS

| | | |
|---|---|---|
| TW | 201407315 | 2/2014 |
| TW | 201415195 | 4/2014 |
| TW | 201507578 | 2/2015 |

Primary Examiner — Anthony Q Edwards
(74) Attorney, Agent, or Firm — McClure, Qualey & Rodack, LLP

(57) ABSTRACT

An electronic device is provided, which includes a display module, a computer module, and a frame. The display module includes a first magnetic element. The computer module includes a second magnetic element. A magnetic attraction element is positioned corresponding to the first and the second magnetic elements and is movably disposed in the frame. A magnetic force produced between the magnetic attraction element and the second magnetic element is varied according to the positioning angle of the supporting frame relative to the computer module. When the positioning angle is greater than a threshold value, the magnetic force is large enough to attract the magnetic attraction element so as to release the display module to move relative to the frame.

10 Claims, 5 Drawing Sheets

(56) References Cited

U.S. PATENT DOCUMENTS

2015/0131218 A1\* 5/2015 Yeh .................... G06F 1/162
    361/679.07
2015/0177785 A1 6/2015 Liang \* cited by examiner

ELECTRONIC DEVICE

CROSS REFERENCE TO RELATED APPLICATIONS

This application claims priority of Taiwan Patent Application No. 104114226, filed on May 5, 2015, the entirety of which is incorporated by reference herein.

BACKGROUND

Field of the Invention

The present invention relates to an electronic device, and more particularly to an electronic device using magnetic force to limit a movement between two elements.

Description of the Related Art

Since notebook computers have the same functions as common desktop computers, and with their light, thin design that allows users to carry them conveniently, these notebook computers have become an indispensable tool for some users. As the price for notebook computers is constantly falling, some users have even directly replaced their desktop computers with a notebook.

A notebook computer generally has a host and a display module (for example, a liquid crystal display (LCD)) adapted to be opened from or closed to the host, and the display module may have a touch input function. To allow the user to comfortably perform touch operations on the display, the display module in some notebook computers is not directly pivoted to the host but is connected to the host through a frame, so that the display module can be rotated or the display module can be removed from the host.

In today's electronic devices, complicated structures are used to fixed the position of the display module relative to the host, and these structures can cause an increase in the manufacturing cost as they are not easy to manufacture.

SUMMARY

One of the objectives of the disclosure is to provide an electronic device which can be operated in a variety of different statuses. The electronic device has the advantage of being lightweight and easy to assemble.

According to one embodiment of the disclosure, the electronic device includes a display module, a computer module, a frame, and a magnetic attraction element. The display module includes a display housing and a first magnetic element disposed in the display housing. The computer module includes a host housing and a second magnetic element disposed in the host housing. The frame is pivotably connected to the host housing about a first pivoting axis. The display module is connected to the computer module via the frame. The magnetic attraction element is disposed in the frame in a movable manner between a first position and a second position, wherein the second position is closer to the computer module than the first position.

When the frame is arranged at a first angle relative to the computer module, an attraction force between the first magnetic element and the magnetic attraction element is greater than that between the second magnetic element and the magnetic attraction element, so that the magnetic attraction element is positioned in the first position. When the frame is arranged at a second angle relative to the computer module, an attraction force between the first magnetic element and the magnetic attraction element is smaller than that between the second magnetic element and the magnetic attraction element, so that the magnetic attraction element is positioned in the second position. The second angle is greater than the first angle.

In the embodiment described above, the second angle is in a range from 85 degrees to 135 degrees. In addition, when the frame is arranged at a third angle relative to the computer module, the magnetic attraction element is attracted by the first magnetic element and positioned in a first position, wherein the third angle is greater than the second angle.

In the embodiment described above, the magnetic attraction element has a first segment and a second segment connected to the first segment, wherein the first segment is closer to the first pivoting axis than the second segment, and the cross section of the first segment is greater than the cross section of the second segment. The magnetic attraction element has a T-shaped cross section.

In the embodiment described above, the first magnetic element and the second magnetic element are magnets, and the magnetic attraction element is a magnetic metal, wherein a magnetic force of the first magnetic element is less than a magnetic force of the second magnetic element.

In the embodiment described above, the second magnetic element is arranged offset from the first pivoting axis.

In the embodiment described above, the display housing is pivotably connected to the frame via a second pivoting axis, when the frame is arranged at the second angle relative to the computer module, the magnetic attraction element is positioned in the second position, and the display module is able to rotated about the second pivoting axis.

In the embodiment described above, the frame includes a first bracket, a second bracket, and a third bracket. The first bracket extends parallel to the first pivoting axis. The second bracket and the third bracket are respectively connected to two ends of the first bracket and extend away from the computer module. The display housing is pivotably connected to the second bracket and/or the third bracket.

In the embodiment described above, the electronic device further includes a hinge structure connected to at least one of the second bracket or the third bracket of the display housing, the hinge structure is configured to provide a torque force to fix the display module.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

In the following description, a multi-view auto-stereoscopic display of the present invention will be explained with reference to embodiments thereof. It should be appreciated that these embodiments are not intended to limit the present invention to any specific environment, application or particular implementation described in these embodiments. Therefore, the description of these embodiments is only for the purpose of illustration rather than to limit the present invention. Furthermore, the attached drawings may be drawn in a slightly simplified or exaggerated way for ease of understanding; the numbers, shapes and dimensional scales of elements depicted may not be exactly the same as those in practical implementation and are not intended to limit the present invention.

Figure 1:
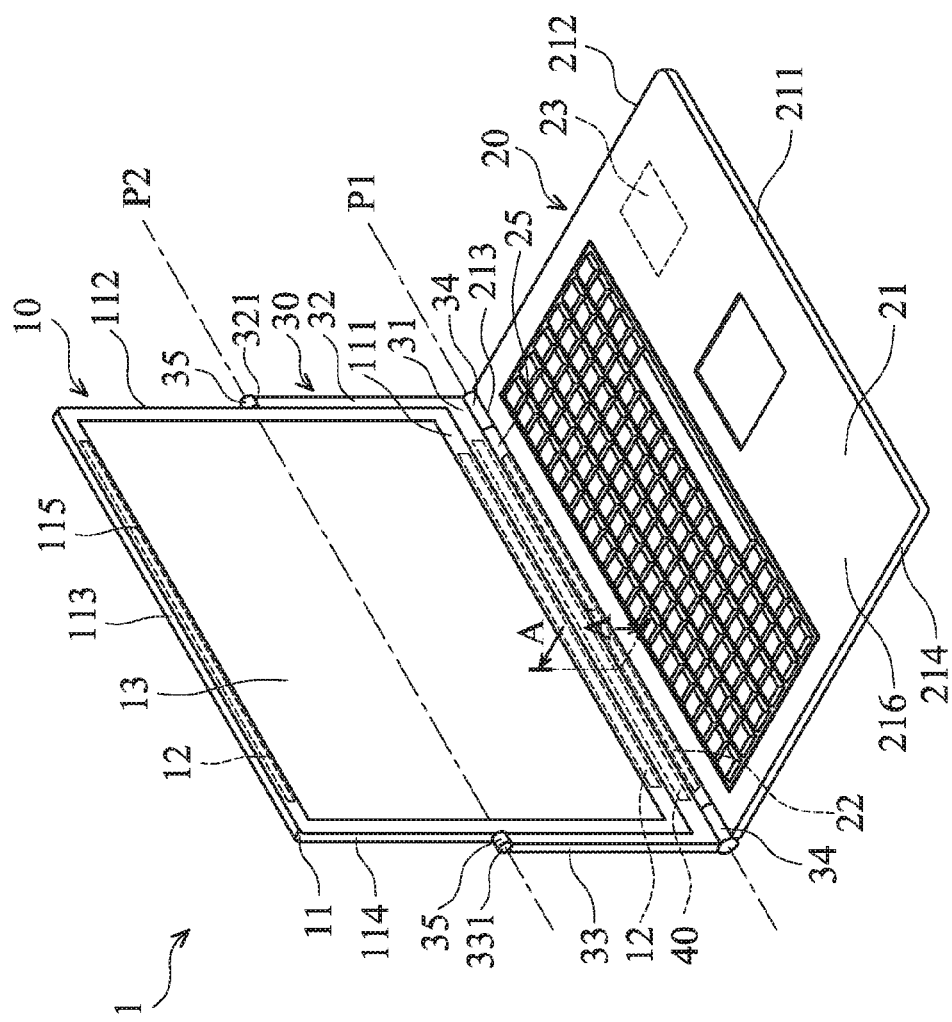
FIG. 1 shows a schematic view of an electronic device of one embodiment of the disclosure, wherein a frame is arranged at a second angle relative to the frame, and a display module is in an open status relative to the frame.

Referring to FIG. 1, in accordance with one embodiment of the disclosure, an electronic device 1, such as a notebook computer, includes a display module 10, a computer module 20, a frame 30, and a magnetic attraction element 40. The frame 30 is pivotably connected to the computer module 20 about a first pivoting axis P1. The display module 10 is connected to the computer module 20 via the frame 30. The display module 10 includes a first magnetic element 12, and the computer module 20 includes a second magnetic element 22. The magnetic attraction element 40 is movably disposed in the frame 30, and normally attracted by the first magnetic element 12. The attraction force between the magnetic attraction element 40 and the second magnetic element 22 is varied according to the positioning angle of the frame 30 relative to the computer module 20. When the positioning angle is greater than a threshold value, since the distance between the first magnetic element 12 and the magnetic attraction element 40 increases, an attraction force between the first magnetic element 12 and the magnetic attraction element 40 is smaller than that between the second magnetic element 22 and the magnetic attraction element 40. As a result, the display module 10 is released to move relative to the frame 30.

One exemplary structural feature of the electronic device 1, in accordance with some embodiments, is described below:

The display module 10 includes a display housing 11, two first magnetic elements 12, and a display panel 13. The display housing 11 has a number of lateral edges, such as first edge 111, second edge 112, third edge 113, and fourth edge 114. The first edge 111, the second edge 112, the third edge 113, and the fourth edge 114 are connected to each other consecutively. The first edge 111 is opposite to the third edge 113, and the second edge 112 is opposite to the fourth edge 114. The display housing 11 defines an opening 115, the display panel 13 is positioned in the display housing 11 corresponding to the opening 115. The display panel 13 is configured to display images according to control signals. In some embodiments, the display panel 13 is a touch panel having a touch sensing function. In some embodiments, the display module 10 is a tablet computer which can be operated independently from the computer module 20.

One of the two first magnetic elements 12 is positioned in the display housing 11 and adjacent to the first edge 111. Another first magnetic element 12 is positioned in the display housing 11 and adjacent to the first edge 113. Each of the two first magnetic elements 12 has a rectangular shape and extending along the first pivoting axis P1.

Figure 2:
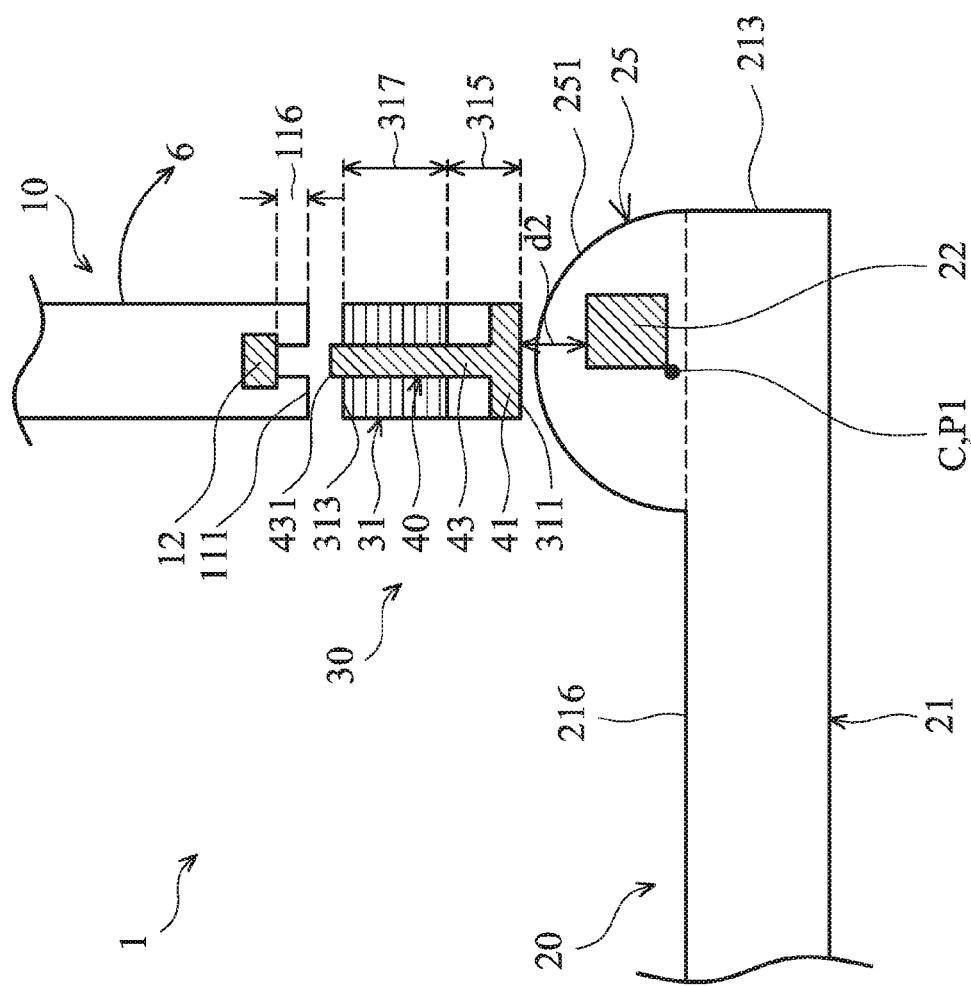
FIG. 2 shows a cross-sectional view seen along line A-A' of FIG. 1.

Referring to FIG. 2, an insertion hole 116 is formed on each first edge 111 and third edge 113 (FIG. 2 only shows the insertion hole 116 formed on the first edge 111). The openings of the two insertion hole 116 are respectively formed on the first edge 111 and the third edge 113. In some embodiments, the insertion hole 116 on the first edge 111 extends in a direction away the first edge 111 and connected to the first magnetic element 12 which is arranged adjacent to the first edge 111, however the disclosure should not be limited thereto. In some other embodiments, the insertion hole 116 on the first edge 111 extends along a direction away from the first edge 111 but is not connected to the first magnetic element 12.

Referring to FIG. 1, the computer module 20 includes a host housing 21, a second magnetic element 22, a operation unit 23, and a protruded housing 25. The host housing 21 has a number of lateral edges, such as first edge 211, second edge 212, third edge 213, and fourth edge 214. The first edge 211, the second edge 212, the third edge 213, and the fourth edge 214 are connected to each other consecutively. The first edge 211 is opposite to the third edge 213, and the second edge 212 is opposite to the fourth edge 214. The operation unit 23 is positioned in the host housing 21 for controlling the operation of the electronic device 1.

As shown in FIG. 2, the protruded housing 25 is connected to a vicinity of the third edge 213 of the host housing 21. In some embodiments, the protruded housing 25 includes a curved surface 251 connected the upper surface 216 to the third edge 213. The curved surface 251 has a uniform curvature and has a center of curvature C, however the disclosure should not be limited thereto. In some other embodiments, the curved surface 251 has a number of sub-sections, consecutively arranged from the upper surface 216 to the third edge 213, wherein each two neighboring sub-sections has a different curvature. The length of the protruded housing 25 in a direction parallel to the first pivoting axis P1 is smaller than the length of the host housing 21 in a direction parallel to the first pivoting axis P1. Two ends of the protruded housing 25 is respectively spaced apart from the second edge 212 and the forth edge 214 by a distance.

The second magnetic element 22 is disposed in the protruded housing 25. The second magnetic element 22 has a rectangular shape and extending along a first pivoting axis P1. In some embodiments, the second magnetic element 22 is arranged offset from the center of curvature C of the curved surface 251, and the second magnetic element 22 is closer to the third edge 213 (rear side of the computer module 20) than the center of curvature C of the curved surface 251. In some embodiments, the second magnetic element 22 is arranged offset from the center of curvature C of the curved surface 251, and the second magnetic element 22 is closer to a highest point of the curved surface 251 (top side of the computer module 20) than the center of curvature C of the curved surface 251.

In some embodiments, the magnetic force of the second magnetic element 22 is greater than the magnetic force of the first magnetic element 12 as measured at a particular distance. For example, the first magnetic element 12 is a N42 magnet, and the second magnetic element is a N52 magnet.

Referring to FIG. 1, the frame 30 has a first bracket 31, a second 23 bracket 32, a third bracket 33, two connecting portions 34, and a number of hinge structures 35. The first bracket 31 extends along a direction parallel to the first pivoting axis P1. The second bracket 32 and the third bracket 33 are respectively connected to two ends of the first bracket 31 and extend away from the computer module 20. The two connecting portions 34 are respectively pivotably connected to two ends of the protruded housing 25, so that the frame 30 is able to pivot about the first pivoting axis P1. The positioning angle of the frame 30 relative to the host housing 21 can be fixed by suitable means. For example, positioning angle of the frame 30 relative to the host housing 21 is fixed by a torque force provided by two hinge structures (not shown in figures) which are disposed in the connecting portion 34.

In the embodiment, as shown in FIG. 2, the first pivoting axis P1 aligns with the center of curvature C of the curved surface 251, however the disclosure should not be limited thereto. In some other embodiments, the first pivoting axis P1 is arranged offset from the center of curvature C, as long as interference between the first bracket 31 of the frame 30 and the housing 21 does not occur during the rotation of the frame 30 relative to the host housing 21.

Referring to FIG. 1, in some embodiments, the distal end 321 of the second bracket 32 and the distal end 331 of the third bracket 33 are respectively connected to the second edge 112 and the fourth edge 114 of the display housing 11. As a result, the display module 10 is able to rotate about the second pivoting axis P2 relative to the frame 30. Two hinge structures 35 are respectively disposed in the distal end 321 of the second bracket 32 and the distal end 331 of the third bracket 33 and connected to the display housing 11. The two hinge structures 35 are configured to fix the positioning angle of the display housing 11 relative to the frame 30. In some embodiments, the torque force provided by the two hinge structures 35 is greater than the touching force applied by a user on the display panel 13.

Referring to FIG. 2, the first bracket 31 of the frame 30 has a lower edge 311 and an upper edge 313 opposite to the lower edge 311. The lower edge 311 is arranged adjacent to the curved surface 251 of the protruded housing 25. The upper surface 313 is arranged adjacent to the first edge 11 of the display module 10. A first guiding groove 315 is formed in the lower edge 311 of the first bracket 31. A second guiding groove 317 is formed on the upper edge 313. The second guiding groove 317 extends away from the upper edge 313 and terminates at the first guiding groove 315. The width of the first guiding groove 315 in a plane perpendicular to the first pivoting axis P1 is greater than the width of the second guiding groove 317 in the same plane.

The magnetic attraction element 40 is disposed in the first bracket 31 of the frame 30 in a moveable manner. The magnetic attraction element 40 has a first segment 41 and a second segment 43 connected to the first segment 41. The first segment 41 is disposed in the first guiding groove 315. The second segment 43 extends from the first segment 41 to the second guiding groove 317 by a predetermined distance and is disposed in the second guiding groove 317. The area of the cross section of the first segment 41 is greater than the area of the cross section of the second segment 43.

As shown in FIG. 2, in the embodiment, the magnetic attraction element 40 has a cross section formed in T-shaped, however the disclosure should not be limited thereto. The shape of the magnetic attraction element 40 can be varied according to the shape of the guiding grooves formed in the frame 30. In some embodiments, the magnetic attraction element 40 has a cross section formed in L-shaped. The magnetic attraction element 40b can includes magnetic metal such as ion, nickel, chromium, cobalt or cadmium or any other material which can be attracted by the first magnetic element 12 and the second magnetic element 22.

Figure 3:
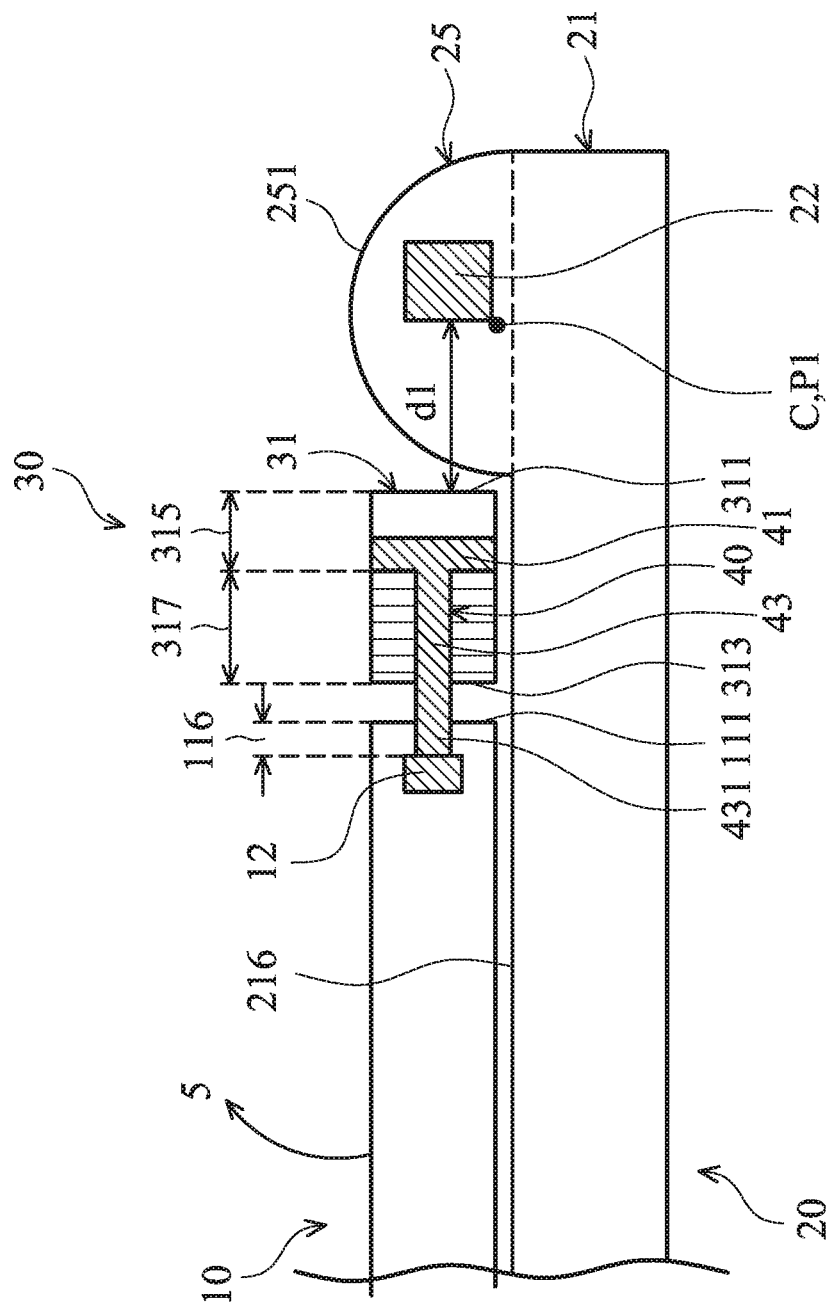
FIG. 3 shows a schematic cross-sectional view of an electronic device of one embodiment of the disclosure, wherein a frame is arranged at a first angle relative to the computer module.

The operation method of the electronic device 1, in accordance with some embodiments, is described below:

FIG. 3 shows a schematic cross-sectional view of an electronic device 1 of one embodiment of the disclosure as the frame 30 is arranged at 0 degrees relative to the computer module 20. In this status, the lower edge 311 of the frame 30 is positioned adjacent to a boundary line of the curved surface 251 of the protruded housing 25 and the upper surface 216 of the host housing 21. The lower edge 311 of the frame 30 is spaced from the second magnetic element 22 by a distance d1. An attraction force between the first magnetic element 12 and the magnetic attraction element 40 is greater than that between the second magnetic element 22 and the magnetic attraction element 40. As a result, the magnetic attraction element 40 is coupled to the first magnetic element 12 and is fixed on a first position as shown in FIG. 3. While at the same time, the first segment 41 abuts the inner wall of the first guiding groove 315 that is immediately connected to the inner wall of the second guiding groove 317. In addition, a portion of the second segment 43 passes through the opening of the second guiding groove 317 and the opening of the insertion hole 116 and penetrates into the display module 10 so as to ensure the position of the display module 10 is fixed and not able to move relative to the frame 30.

If the display module 10 rotates about the pivoting axis P1 along a direction as indicated by the arrow 5 shown in FIG. 3, the lower edge 311 of the frame 30 is circumferentially moved along the curved surface 251 of the protruded housing 25. During the movement, the distance between the magnetic attraction element 40 and the second magnetic element 22 gradually decreases, so that the magnetic force between the magnetic attraction force element 40 and the second magnetic element 22 gradually increases.

FIG. 2 shows a schematic cross-sectional view of an electronic device of one embodiment of the disclosure as the frame 30 is arranged at 90 degrees relative to the computer module 20. When the frame 30 is positioned in an angle greater than a first threshold angle (such as 85-89 degrees), a second distance d2 exists between the lower edge 311 of the frame 30 and the second magnetic element 22. An attraction force between the first magnetic element 12 and the magnetic attraction element 40 is smaller than that between the second magnetic element 22 and the magnetic attraction element 40. As a result, the magnetic attraction element 40 is coupled to the second magnetic element 22 and is fixed on a second position as shown in FIG. 2. While at the same time, the first segment 41 abuts the lower edge 311 of the frame 30. In addition, the distal end 431 of the second segment 43 is separated from the insertion hole 116. In some embodiments, since the length of the second segment 43 is greater than the length of the second guiding groove 317, when the magnetic attraction element 40 is in the second position, the distal end 431 of the second segment 43 is exposed out of the upper edge 313 via the second guiding groove 317 even though the distal end 431 of second segment 43 is separated from the insertion hole 116. In some other embodiments, when the magnetic attraction element 40 is in the second position, the distal end 431 of the second segment 43 is located in the second guiding groove 317 and not exposed to outside.

Figure 4:
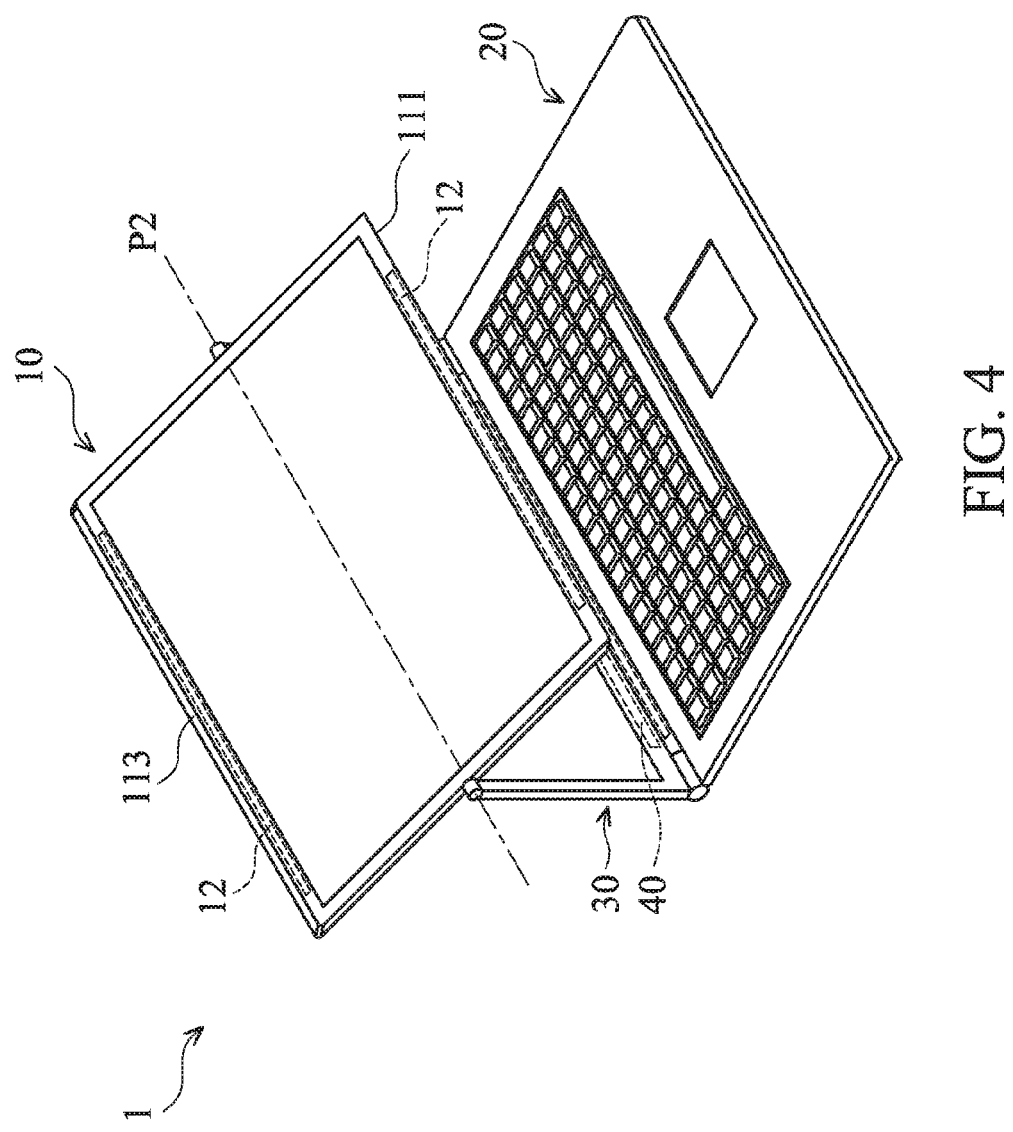
FIG. 4 shows a schematic view of an electronic device of one embodiment of the disclosure, wherein a frame is arranged at a second angle relative to the computer module, and a display module is in an adjusting status relative to the frame.

At this time, as shown in FIG. 4, the display module 10 is allowed to change the positioning angle of the display module 10 by rotating about the second pivoting axis P2 relative to the frame 30 for facilitating the viewing and operation of the user. In some embodiments, the display module 10 pivots about the second pivoting axis P2 by 180 degrees, so that the first magnetic element 12 disposed at the third edge 113 is positioned adjacent to the magnetic attraction element 40. As a result, the display module 10 can be oriented to the other side to meet different requirements.

If the display module 10 continuously rotates about the pivoting axis P1 along a direction indicated as the arrow 6 shown in FIG. 2, the lower edge 311 of the frame 30 is circumferentially moved along the curved surface 251 of the protruded housing 25 toward to the boundary line of the third edge 213 and the curved surface 251. During the movement, the distance between the second magnetic element 22 and the magnetic attraction element 40 increases, and the magnetic force between the magnetic attraction force element 40 and the second magnetic element 22 gradually decreases.

Figure 5:
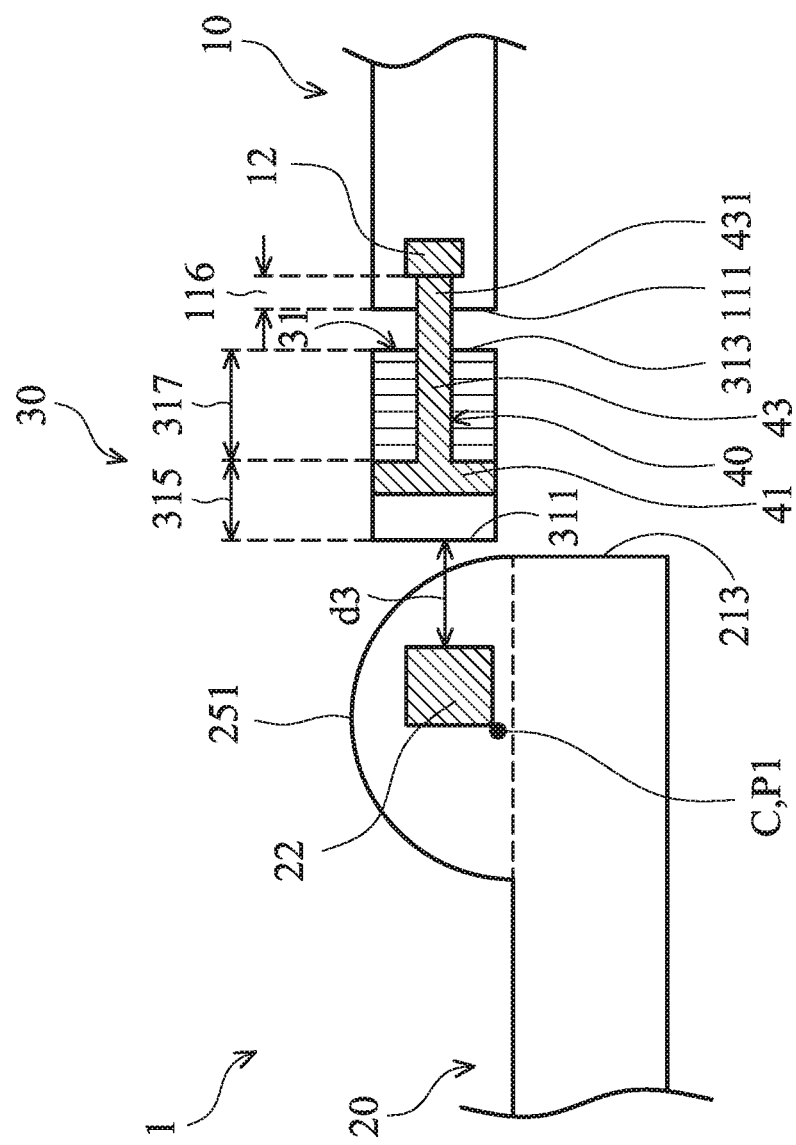
FIG. 5 shows a schematic cross-sectional view of an electronic device of one embodiment of the disclosure, wherein a frame is arranged at a third angle relative to the computer module.

FIG. 5 shows a schematic cross-sectional view of an electronic device of one embodiment of the disclosure as the frame 30 is arranged at 180 degrees relative to the computer module 20. When the frame 30 is positioned in an angle greater than a second threshold angle (such as 120-135 degrees), a third distance d3 exists between the lower edge 311 of the frame 30 and the second magnetic element 22. An attraction force between the first magnetic element 12 and the magnetic attraction element 40 is greater than that between the second magnetic element 22 and the magnetic attraction element 40. As a result, the magnetic attraction element 40 is coupled to the first magnetic element 12 and is fixed on a first position as shown in FIG. 5. A portion of the second segment 43 passes through the opening of the second guiding groove 317 and the opening of the insertion hole 116 and penetrates into the display module 10 so as to ensure the position of the display module 10 is fixed and not able to move relative to the frame 30.

In the embodiments described above, distance d1 (FIG. 3) is greater than distance d3 (FIG. 5), and distance d3 is greater than distance d2 (FIG. 2). Additionally, it should be noted that, in order to increase the magnetic force between the magnetic attraction element 40 and the second magnetic element 22, the width of the first segment 41 of the magnetic attraction element 40 is greater than the width of the second segment 42 of the magnetic attraction element 40, and the magnetic force of the second magnetic element 22 is greater than the magnetic force of the first magnetic element 12.

It should be appreciated that while in the embodiment shown in FIG. 1 only one first magnetic element 12, one second magnetic element 22, and one magnetic attraction element 40 are utilized, the number of first magnetic elements 12, the second magnetic elements 22, and the magnetic attraction elements 40 should not be limited thereto. In some other non-illustrated embodiments, the electronic device 1 has a number of magnetic attraction elements 40 arranged along a direction parallel to the first pivoting axis P1. The number of first magnetic elements 12 and the number of second magnetic elements 22 can be one. Alternatively, the number of first magnetic elements 12 and/or the number of second magnetic elements 22 correspond to the number of magnetic attraction elements 40. The first magnetic elements 12 and/or the second magnetic elements 22 are arranged along a direction parallel to the first pivoting axis P1. In addition, while in the above embodiments the display module 10 is pivotably connected to the frame 30, it is not limited thereto. In some other embodiments, each of the second bracket 32 and the third bracket 33 has a sliding rail. The display module 10 is disposed in the sliding rails in a slidable manner. Whether or not the display module 10 can be drawn out is determined by the positioning angle of the frame 30 relative to the computer module 20.

In the electronic device 1 of the disclosure, the display module 10 and the computer module 20 have respective magnetic elements 12 and 22 arranged corresponding to the magnetic attraction elements 40. The distance between the magnetic attraction elements 40 and the magnetic elements 12 and 22 are varied as the positioning angle of the frame 30 relative to the computer module 20 is changed. Therefore, when the positioning angle of the frame 30 relative to the computer module 20 is at a first angle that is smaller than a first threshold angle, or when the positioning angle of the frame 30 relative to the computer module 20 is at a third angle that is greater than a second threshold angle, the magnetic attraction elements 40 is coupled to the magnetic element 12, and the position of the display module 10 is limited. When the positioning angle of the frame 30 relative to the computer module 20 is at a second angle that is between the first and second threshold angle, the magnetic attraction elements 40 are coupled to the magnetic element 22, and the display module 10 is released. Therefore, the display module 10 is able to be moved relative to the frame 30.

While the disclosure has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a display module comprising a display housing and a first magnetic element disposed in the display housing;
a computer module comprising a host housing and a second magnetic element disposed in the host housing;
a frame pivotably connected to the host housing about a first pivoting axis, wherein the display module is connected to the computer module via the frame; and
a magnetic attraction element disposed in the frame in a movable manner between a first position and a second position, wherein the second position is closer to the computer module than the first position;
when the frame is arranged at a first angle relative to the computer module, an attraction force between the first magnetic element and the magnetic attraction element is greater than that between the second magnetic element and the magnetic attraction element, so that the magnetic attraction element is positioned in the first position;
when the frame is arranged at a second angle relative to the computer module, an attraction force between the first magnetic element and the magnetic attraction element is smaller than that between the second magnetic element and the magnetic attraction element, so that the magnetic attraction element is positioned in the second position, wherein the second angle is greater than the first angle.

2. The electronic device as claimed in claim 1, wherein the second angle is in a range from 85 degrees to 135 degrees.

3. The electronic device as claimed in claim 2, wherein when the frame is arranged at a third angle relative to the computer module, the magnetic attraction element is attracted by the first magnetic element and positioned in a first position, wherein the third angle is greater than the second angle.

4. The electronic device as claimed in claim 1, wherein the magnetic attraction element has a first segment and a second segment connected to the first segment, wherein the first segment is closer to the first pivoting axis than the second segment, and the cross section of the first segment is greater than the cross section of the second segment.

5. The electronic device as claimed in claim 4, wherein the magnetic attraction element has a T-shaped cross section.

6. The electronic device as claimed in claim 1, wherein the first magnetic element and the second magnetic element are magnets, and the magnetic attraction element is a magnetic metal, wherein a magnetic force of the first magnetic element is less than a magnetic force of the second magnetic element.

7. The electronic device as claimed in claim 1, wherein the second magnetic element is arranged offset from the first pivoting axis.

8. The electronic device as claimed in claim 1, wherein the display housing is pivotably connected to the frame via a second pivoting axis, when the frame is arranged at the second angle relative to the computer module, the magnetic attraction element is positioned in the second position, and the display module is able to rotated about the second pivoting axis.

9. The electronic device as claimed in claim 8, wherein the frame comprises:
  a first bracket, extending parallel to the first pivoting axis;
  a second bracket; and
  a third bracket, wherein the second bracket and the third bracket are respectively connected to two ends of the first bracket and extend away from the computer module;
  wherein the display housing is pivotably connected to at least one of the second bracket and third bracket.

10. The electronic device as claimed in claim 9, further comprising a hinge structure connected to at least one of the second bracket or the third bracket of the display housing, the hinge structure is configured to provide a torque force to fix the display module.

* * * * *